United States Patent
Ben-Yacov et al.

(10) Patent No.: US 8,166,220 B2
(45) Date of Patent: Apr. 24, 2012

(54) DEVICE FOR CONNECTION WITH A STORAGE DEVICE AND A HOST

(75) Inventors: Shai Ben-Yacov, Ra'anana (IL); Itzhak Pomerantz, Kfar Saba (IL); Judah Gamliel Hahn, Ofra (IL)

(73) Assignee: Sandisk IL Ltd., Kfar Saba (IL)

( * ) Notice: Subject to any disclaimer, the term of this patent is extended or adjusted under 35 U.S.C. 154(b) by 142 days.

(21) Appl. No.: 12/185,760

(22) Filed: Aug. 4, 2008

(65) Prior Publication Data
US 2010/0030929 A1 Feb. 4, 2010

(51) Int. Cl.
*G06F 13/12* (2006.01)
*G06F 13/38* (2006.01)

(52) U.S. Cl. ............... 710/74; 710/62; 710/63; 710/64; 710/65; 710/66; 710/67; 710/68; 710/69; 710/70; 710/71; 710/72; 710/73

(58) Field of Classification Search ............... 710/62–74
See application file for complete search history.

(56) References Cited

U.S. PATENT DOCUMENTS

| | | | |
|---|---|---|---|
| 6,795,327 B2 | 9/2004 | Deng et al. | |
| 7,136,951 B2 | 11/2006 | Deng et al. | |
| 7,433,991 B2 * | 10/2008 | Fujita et al. | 710/316 |
| 7,454,783 B2 * | 11/2008 | Dupouy et al. | 726/7 |
| 2005/0114643 A1 | 5/2005 | Bryant-Rich et al. | |
| 2006/0095644 A1 | 5/2006 | Fujita et al. | |
| 2006/0130129 A1 * | 6/2006 | Dai et al. | 726/9 |
| 2007/0033320 A1 * | 2/2007 | Wu et al. | 711/100 |
| 2007/0106823 A1 | 5/2007 | Yang et al. | |
| 2008/0303631 A1 * | 12/2008 | Beekley et al. | 340/5.74 |
| 2009/0006724 A1 | 1/2009 | Chang et al. | |
| 2009/0006796 A1 | 1/2009 | Chang et al. | |
| 2010/0030982 A1 | 2/2010 | Sela et al. | |

FOREIGN PATENT DOCUMENTS

| | | |
|---|---|---|
| WO | 2005059755 A1 | 6/2005 |
| WO | 2006130119 A1 | 12/2006 |

OTHER PUBLICATIONS

International Search Report and Written Opinion received in corresponding PCT Application No. PCT/US2009/050876 from the International Searching Authority (EPO) mailed Jan. 15, 2010, 16 pages.

* cited by examiner

*Primary Examiner* — Chun-Kuan Lee
(74) *Attorney, Agent, or Firm* — Toler Law Group, PC (57) ABSTRACT

A dual-interface connector for providing an interface to a storage device and an interface to a host and for connecting between a storage device and a host includes a storage device interface, for connecting with a storage device, and a host interface, for connecting with a host. A controller is operable in at least two distinct modes of operation. In a first mode of operation, the controller enables a session to be opened, by the host, between the storage device and the host when the storage device is connected to the storage device interface and the host is connected to the host interface. In a second mode of operation, the controller is operative, if an open session exists between the storage device and the host, to maintain the open session between the storage device and the host even after the storage device is disconnected from the storage device interface.

20 Claims, 8 Drawing Sheets

| Size of command in Bytes | Command type | Data |
|---|---|---|
| 125 | Get Descriptor command | "Cruzer" |

FIG. 6A

| Size of command in Bytes | Command type | Data |
|---|---|---|
| 125 | Get Descriptor command | "Cruzer \xFDEF \x0032 \xFFFF " |

DEVICE FOR CONNECTION WITH A STORAGE DEVICE AND A HOST

FIELD OF THE INVENTION

The present invention relates generally to the connection between a storage device and a host. More particularly, the present invention relates to a device that is used for providing an interface to a host device and a storage device, such as a USB flash drive, and for connecting between a storage device and the host.

BACKGROUND OF THE INVENTION

Using a portable storage medium, such as a USB flash drive (UFD), with public computers is very convenient for users that need to use a computer for work while away from the office or for personal business while away from home. For example, a user may wish to log into a public computer, such as one provided in a kiosk in a public place (e.g., an airport terminal or shopping mall), using his/her USB flash drive.

However, by its very nature this set up is not conducive to maintaining privacy or information security. By using such public computer set up unauthorized bystanders may compromise the security of a user's information. For instance, a user may turn away or step away from the computer for a moment and during the users' absence or inattentiveness a bystander may steal the USB flash drive or access its stored content. This could be also true with a mobile computing or communications device that is available for public use. Accordingly there is a need to improve information security in the context of public computer installations.

SUMMARY OF EXEMPLARY EMBODIMENTS OF THE INVENTION

In view of the foregoing observations and the present needs, it would be advantageous to have a device functioning as a dual-interface connector for providing an interface to a storage device and an interface to a host and for maintaining an open session between the storage device and the host during and/or after a storage device is disconnected from the host.

Embodiments, various examples of which are discussed herein, include a device for providing an interface to a storage device and an interface to a host and for connecting between a storage device and a host, the device having a storage device interface configured to operatively connect with a storage device (such as a USB flash drive; a host interface configured to operatively connect with a host; and a controller that is coupled to the storage device interface and to the host interface and operable in at least two distinct modes of operation. In a first mode of operation, the controller is operative to enable a host to open a session between a storage device and the host when the storage device is operatively connected to the storage device interface and the host is operatively connected to the host interface. Whereas, in a second mode of operation, the controller is operative, if an open session exists between the storage device and the host, to maintain the open session between the storage device and the host even after the storage device is disconnected from the storage device interface.

The storage device may be a USB flash drive with a wired interface or a USB flash drive with a wireless interface.

The controller may be responsive to a session control application resident on a host, for notifying the session control application of connection/disconnection of a storage device to the host. The device may be adapted to modify signals that are transmitted between the storage device and the host.

In accordance with another embodiment, there is provided a storage assembly including a storage device; and a device that is configured in a similar manner to the dual-interface connector described herein above.

In accordance with yet another embodiment, there is provided a host for connecting with a device functioning as dual-interface connector, the host including a user interface; a device interface (being a USB port connection, for example) that is configured to operatively connect with a device functioning as a dual-interface connector; and a session control application. The session control application is operative to (a) unlock the user-interface when a storage device is connected to the host, via the dual-interface connector, (b) to lock the user-interface after the storage device is disconnected from the dual-interface connector, and (c) to unlock the user-interface if the storage device is reconnected to the host, via the dual-interface connector.

Additional features and advantages of the embodiments described are possible as will become apparent from the following drawings and description.

BRIEF DESCRIPTION OF THE DRAWINGS

For a better understanding of the various embodiments, reference is made to the accompanying drawings, in which like numerals designate corresponding sections or elements throughout, and in which.

DETAILED DESCRIPTION OF EXEMPLARY EMBODIMENTS

The embodiments and various aspects thereof are further described in more details below. This description is not intended to limit the scope of claims but instead to provide examples of such embodiments. The following discussion therefore presents exemplary embodiments, which includes a device functioning as a dual-interface connector for connecting between a storage device and a host.

The host discussed herein may be a personal computer, a notebook computer, a hand held computing device, such as a PDA (Personal Digital Assistant) or mobile handset, a cellular telephone, a camera, an audio reproducing device, or any other electronic device that work with removable data storage. A host may have various personal information management applications, such as an address book, a daily organizer, and electronic notepads, to name a few.

A storage device with which such storage device is used may be any storage device known in the art that is operative to connect directly to and communicate directly with a host. Such storage device may have a configuration that complies with a memory card format, including a secured digital memory card format and a multimedia card format. The storage device may include an array of memory cells (such as FLASH) having the capacity to store data in binary form in either a volatile or non-volatile manner. Note that having FLASH type memory cells is not meant as a limitation, as other embodiments using any appropriate type of memory cell are further applicable.

The storage device discussed herein may have a configuration that complies with a USB flash drive (UFD), including a wireless UFD (i.e., a USB flash drive having a wireless interface), see for example the Seagate® D.A.V.E™ (Digital Audio Video Experience) platform, that is available by Seagate®.

The storage device may also have a configuration that complies with any memory (e.g. flash memory), memory stick, and/or memory card format, such as a secured digital (SD) memory card format used for storing digital media such as audio, video, or picture files. The storage device may also have a configuration that complies with a multi media card (MMC) memory card format, a compact flash (CF) memory card format, a flash PC (e.g., ATA Flash) memory card format, a smart-media memory card format, a USB flash drive, or with any other industry standard specifications. One supplier of these memory cards is SanDisk Corporation, assignee of this application.

The storage device may also have a configuration complying with a high capacity SIM (HCS) memory card format. The HCS memory card format is a secure, cost-effective and high-capacity storage solution for the increased requirements of multimedia handset, typically configured to use a host's network capabilities and/or other resources, to thereby enable network communication.

The storage device may have a nonvolatile memory that retains its memory or stored state even when power is removed. A removable mass storage device with non-volatile memory can be used as a replacement of or a supplement to an embedded mass storage device such as hard drive or solid state drive. A non-volatile memory may include erasable programmable memory technologies, including but not-limited to electrically-erasable and programmable read-only memories (EEPROMs), EPROM, MRAM, FRAM ferroelectric and magnetic memories. Note that the storage device may be implemented with any type of memory, whether flash memory or other type of memory. The storage device may also be implemented with a one-time programmable (OTP) memory chip and/or with a 3-dimensional memory chip technology.

Figure 1:
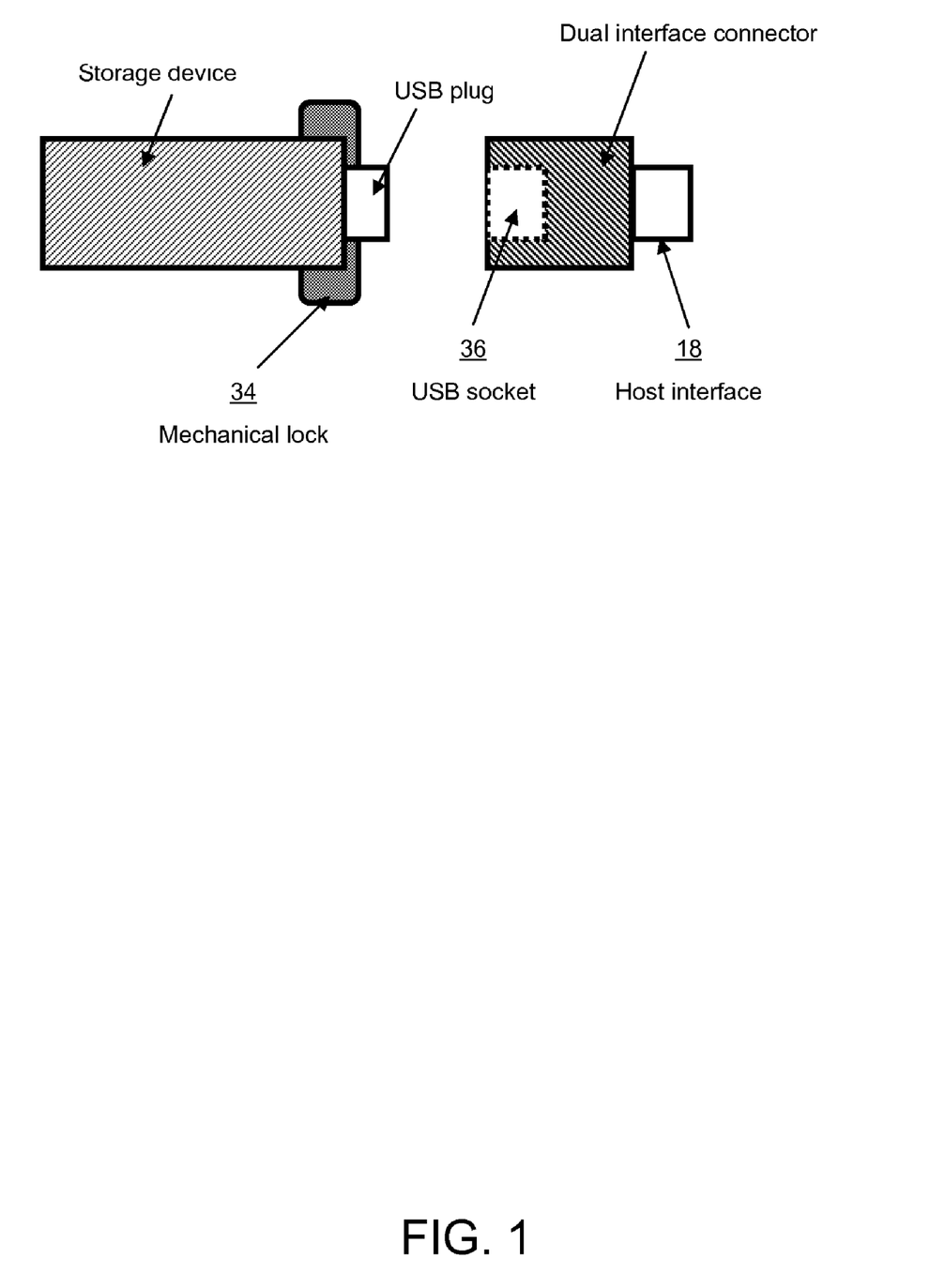
FIG. 1 is a schematic illustration showing a dual-interface connector in connection with a storage device.

FIG. 1 is a schematic illustration showing a device functioning as a dual-interface connector 10 in connection with a storage device 12.

Dual-interface connector 10 includes a USB socket 36 for connection with a device (such as storage device 12); and a host interface 18 for operationally connecting with a host. Note that communication between dual-interface connector 10 and storage device 12, and further between dual-interface connector 10 and a host may be via any interface port connection, using any communication channel known in the art.

In this example, storage device 12, being a USB Flash drive (UFD) for example, includes a USB plug 32 for connection with an external device (such as dual-interface connector 10 or host 18). Again, connection between storage device 12 and dual-interface connector 10 may be via USB plug 32 or via any port connection, including for example PCI Express port connection, FireWire port connection, etc.

Note that storage device 12 may be optionally configured with a mechanical lock 34 that is affixed to it. Mechanical lock 34 may be provided for securing storage device 12 to dual-interface connector 10 when storage device 12 is mounted to dual-interface connector 10.

Figure 2:
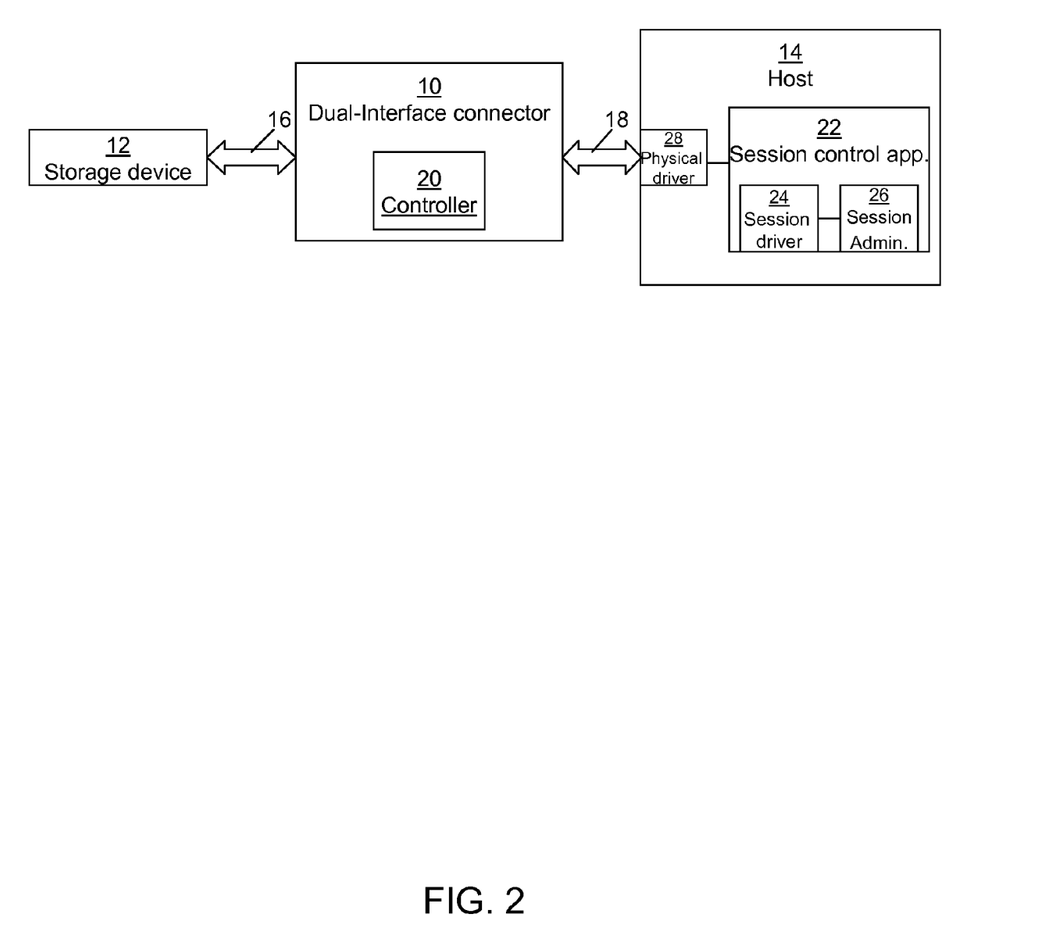
FIG. 2 is a block diagram of a dual-interface connector used for connection with a storage device and with a host, according to one embodiment.

FIG. 2 is a block diagram of a device functioning as dual-interface connector 10 for connection with storage device 12 and with a host 14, according to one embodiment. Dual-interface connector 10 includes a storage device interface 16 for operationally connecting with a storage device; and host interface 18 for operationally connecting with host 14.

Storage device interface 16 and host interface 18 may utilize any communication link known to those skilled in the art, including a USB connector into which a storage device is physically coupled, an optical port connection, an electrical port connection, a SATA (Serial Advanced Technology Attachment) port connection that is based on serial signaling technology, a PCI Express port connection, a FireWire port connection, an MMC memory card format port connection, an SD memory card format port connection, and a memory stick port connection among others. With dual-interface connector 10 of the exemplary embodiments being in communication with a storage device over a conventional wired or wireless communication link, the storage device interface can be a wired or wireless port.

Storage device 12 also includes a controller 20 that is connectable to storage device interface 16 and to host interface 18. Controller 20 controls the communication link between storage device 12 and host 14 by controlling data transfer in and out of dual-interface connector 10 via host interface 18.

Host 14 is operable to open a new session with storage device 12 via a physical driver 28 on host 14. The session is established, enabled and terminated between a host and a storage device using controller 20 of dual-interface connector 10. Accordingly, in the presence of dual-interface connector 10 that is operationally connected to both a storage device and a host, the host cannot communicate with the storage device directly. Dual-interface connector 10 can maintain an open session (a currently activated session) conducted between a storage device and a host even when the storage device is absent (i.e., not connected to dual-interface connector 10).

In the context of this description, a "session" (or an "open session") begins when both dual-interface connector 10 and storage device 12 are operationally connected to the host, and the session ends when both are disconnected from the host. In other words, removing only storage device 12 from dual-interface connector 10 (and from host 14) does not end the session.

Unlike the use of a hub device that provides a communication channel between a storage device and a host by maintaining a first session with the storage device and a second, separate session with the host (and a removal/disconnection of the storage device leads to termination of an open session), in the exemplary embodiments dual-interface connector 10 maintains a single session (i.e., a single communication channel) between a storage device and a host. Furthermore, the dual-interface connector 10 of the exemplary embodiments may be employed to maintain an open session between the storage device and the host during and/or after storage device 12 is disconnected from the host.

For the sake of example only, dual-interface connector 10 is operable in two distinct modes of operation; a first mode for enabling a session between a storage device and a host; and a second mode for maintaining a session between a storage device and a host (if such session already exists).

In a first mode of operation, dual-interface connector 10 allows full communication between storage dual-interface connector 12 and host 14, via controller 20 of dual-interface connector 10. The session is enabled when controller 20 senses that storage device 12 and host 14 are operationally connected to the dual-interface connector 10, via storage device interface 16 and host interface 18 respectively.

In a second mode of operation, dual-interface connector 10 is operative to maintain an open session between storage device 12 and host 14, if such open session exists. Dual-interface connector 10 transitions to operate in the second mode of operation after storage device 12 is disconnected from dual-interface connector 10, via storage device interface 16. In order to maintain an open session, controller 20 of dual-interface connector 10 does not terminate operation of existing applications currently using the resources of the host and/or running on the host, thus keeping the session alive.

In other words, controller 20 of dual-interface connector 10 can maintain an open session (a currently activated session) between a storage device and a host even when the storage device is no longer engaged (i.e. not connected to dual-interface connector 10). As a result of maintaining a session open, for short work intermissions a user need only unplug the storage device from dual-interface connector 10 and need not log off. In this exemplary scenario, controller 20 of the dual-interface connector 10 detects disconnection of storage device 12 and maintains the open session with storage device 12 until the user re-connects it to dual-interface connector 10 (or until dual-interface connector 10 is detached/unplugged from host 14).

Note that in the context of the present disclosure, an "operational connection" may be a physical and operational connection (for example plugging the storage device into the storage device interface) or it may be an operational connection only (for example turning on the power). Accordingly, an operational removal can be a physical and operational removal/disconnection (for example extracting the storage device from the storage device interface) or an operational removal/disconnection only (for example turning off the power).

In one implementation, dual-interface connector 10 notifies a session control application 22 residing on host 14 of connection of a storage device, by modifying signals that are transmitted between storage device 12 and host 14 during the enumeration process. To this end, dual-interface connector 10 can detect connection of a storage device as such using descriptors, see FIG. 4.

Enumeration is the process of determining what device has just been connected to the bus and what parameters this device requires, such as number and type of endpoint(s), class of product, etc. A host connectable to the bus will then assign the device an address and enable a configuration, allowing the device to transfer data on the bus.

Per the USB 2.0 Specification, section 9.1.2, a descriptor that is created by a storage device includes fixed information that is indicative of the identification and type (characteristics) of the particular storage device. The descriptor is the information provided from the storage device to a host in response to a corresponding host request, such as a Get Descriptor request (request code 0x06).

The modified descriptors are detected by session control application 22 during the enumeration process, i.e., during host detection of a connection with a storage device. Session control application 22 is configured to control access to a session conducted between storage device 12 and host 14 by unlocking a user interface of host 14 when storage device 12 is connected to host 14 (via dual-interface connector 10); to lock the user interface after storage device 12 is disengaged (operational removed/disconnected) from host 14 (and from dual-interface connector 10); and to unlock this user interface if storage device is reconnected to host 14 via dual-interface once more. In the context of the present disclosure, a "locking" operation prevents a user using a storage device from interacting with a host that is connected to dual-interface connector 10. Accordingly, an "unlocking' operation reverses this locking operation.

The complete process for locking and unlocking of the user interface (i.e., of the working station with the host) may be implemented in connection with dual-interface connector 10 of the exemplary embodiments, according to the workstation lock command (xlock) for Linux, which locks the workstation display and protects it from unauthorized use until the user enters his/her password at the keyboard. While this workstation lock command is running on the host, all new server connections are refused. If a key or a mouse button is pressed then the user is prompted to enter the password of the user who worked on this host before the locking of the user interface was initiated. If the correct password is typed, then the screen is unlocked and the workstation is restored.

Note that information security and/or privacy is maintained thereby during a work intermission with a storage device, also per this workstation lock command of Linux.

Figure 5:
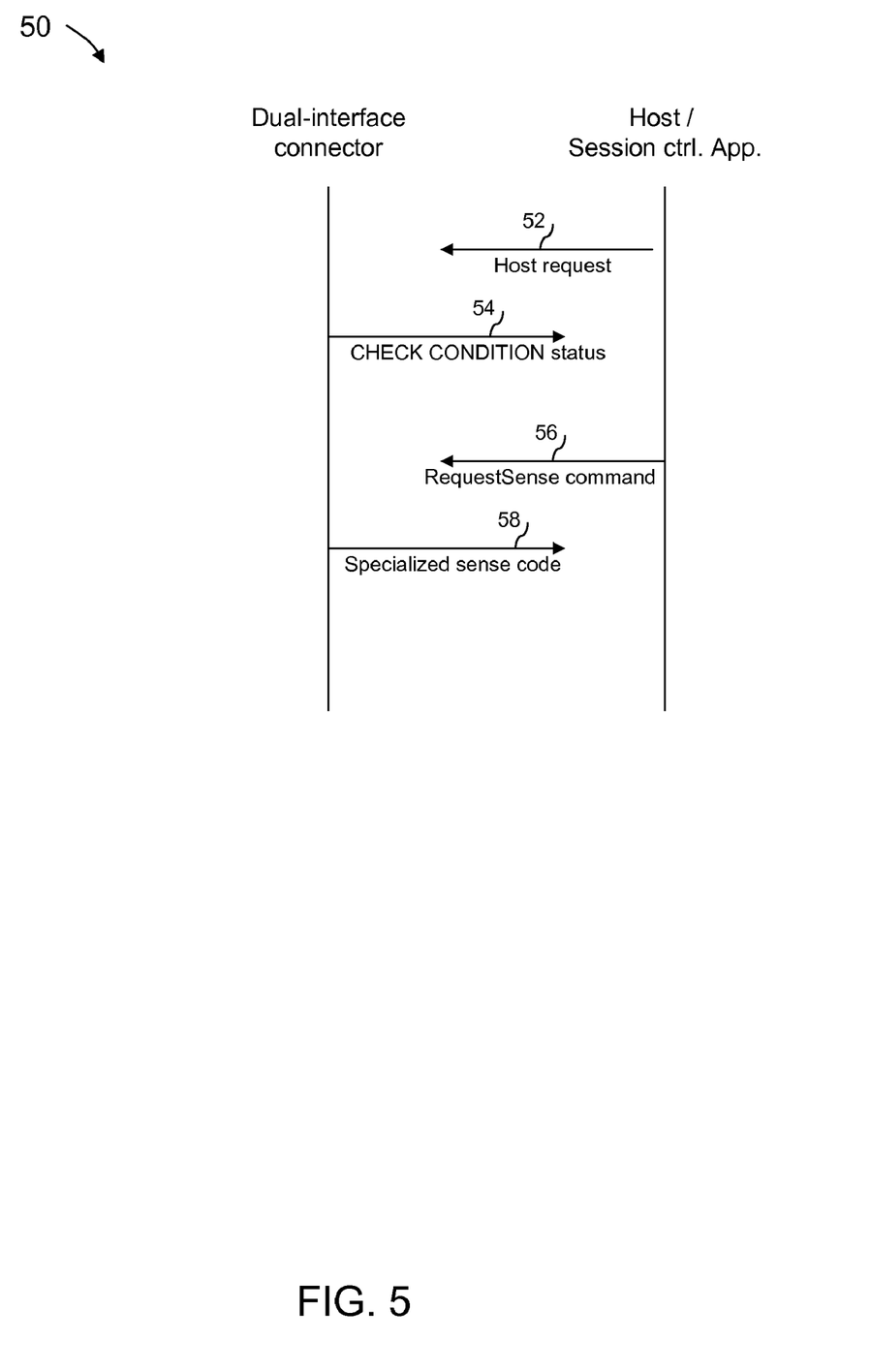
FIG. 5 is a schematic illustration showing signals flowing between the dual-interface connector and the host, according to another embodiment.

Dual-interface connector 10 is further operable to notify session control application 22 residing on the host 14 of a disconnection of a storage device using a specialized sense code, see FIG. 5.

In the context of the present disclosure, a "specialized sense code" includes data describing an error or exceptional condition to indicate the host the absence of a connectable storage device. The dual-interface connector 10 delivers this data to the host, via the specialized sense code, as a CHECK CONDITION status or as a parameter data in response to every RequestSense command that is initiated by the host. Per the T10 SPC-2 standard, which relates to Information Technology—SCSI Primary Commands, the RequestSense command may be used by an application client to obtain error code information, including the status of previous commands being executed.

Session control application 22 includes a session control administrator 26 and a session control driver 24. Session control driver 24, functioning as an agent of session control administrator 26, is operable to detect a connection/disconnection of dual-interface connector 10 from host 14 (by detecting descriptors in signals flowing in and out of the host 14) and to notify session control administrator 26 accordingly.

Session control administrator 26, being in communication with session control driver 24, receives the corresponding signal received from session control driver 24 and locks/unlocks the user interface of host 14 in a similar manner discussed above.

Session control application 22 could be launched onto the operating system of the host, or preinstalled on the host. For example, session control application 22 can be downloaded onto host 14 from the network, via an installation CD, a Windows update mechanism, and/or downloaded onto the host by a launching application resident on storage device 12 using dual-interface connector 10.

With host 14 supporting a trace removal application, session control administrator 26 can be further implemented herein to track (i.e. detect and record) changes that occur in data stored in a non-volatile memory of host 14 while dual-interface connector 10 is in connection with storage device 12; and to subsequently remove evidence of the tracked changes from the non-volatile memory of host 14 after dual-interface connector 10 is no longer connected to host 14. A trace removal application operable to track changes and to remove evidence as such is recited in U.S. Pat. No. 7,296,144, to Bryant-Rich et al., which is incorporated herein by reference in its entirety.

Note that the host of the exemplary embodiments may be a specialized host device pre-configured with the various functionalities discussed herein above or may be a host device that has been configured to include this functionality.

Figure 3A:
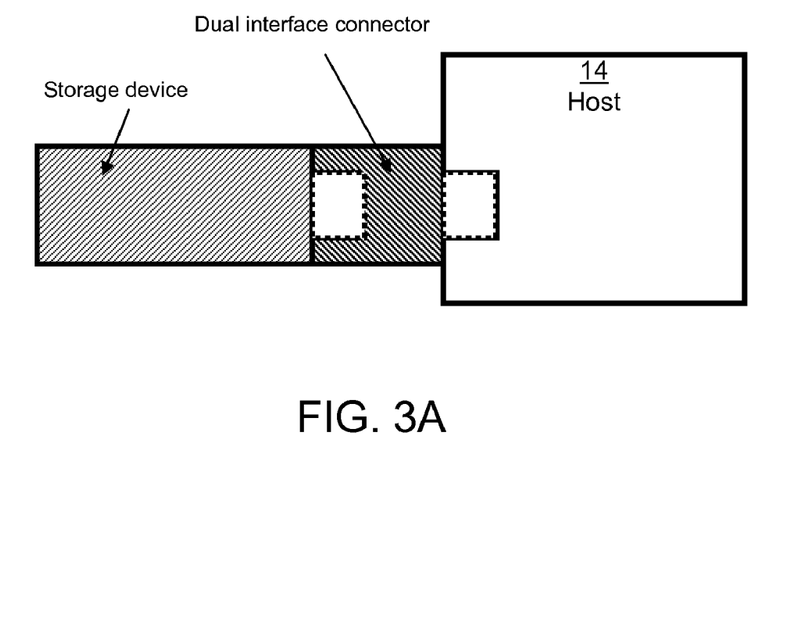
FIG. 3A is a schematic illustration showing dual-interface connector in connection with a storage device and with a host, in a first mode of operation.

FIG. 3A is a schematic illustration showing dual-interface connector 10 in connection with storage device 12 and with host 14, in a first mode of operation. As mentioned above, in a first mode of operation (with dual-interface connector 10 operationally connected to storage device 12 and further mounted to host 14), dual-interface connector 10 allows full communication between storage dual-interface connector 12 and host 14.

Figure 3B:
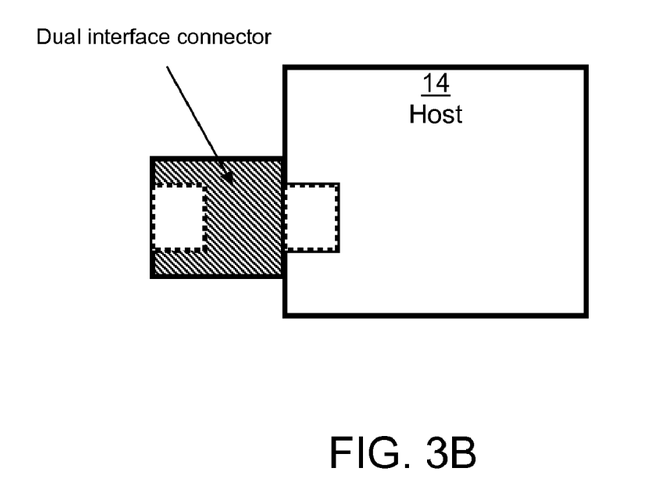
FIG. 3B is a schematic illustration showing dual-interface connector in connection with a host, in a second mode of operation.

FIG. 3B is a schematic illustration showing dual-interface connector 10 in connection with host 14, in a second mode of operation. Again as mentioned above, in a second mode of operation (with dual-interface connector 10 disconnected from storage device 12 but still mounted to host 14), dual-interface connector 10 maintains an open session between storage device 12 and host 14, if such open session exists.

Figure 4:
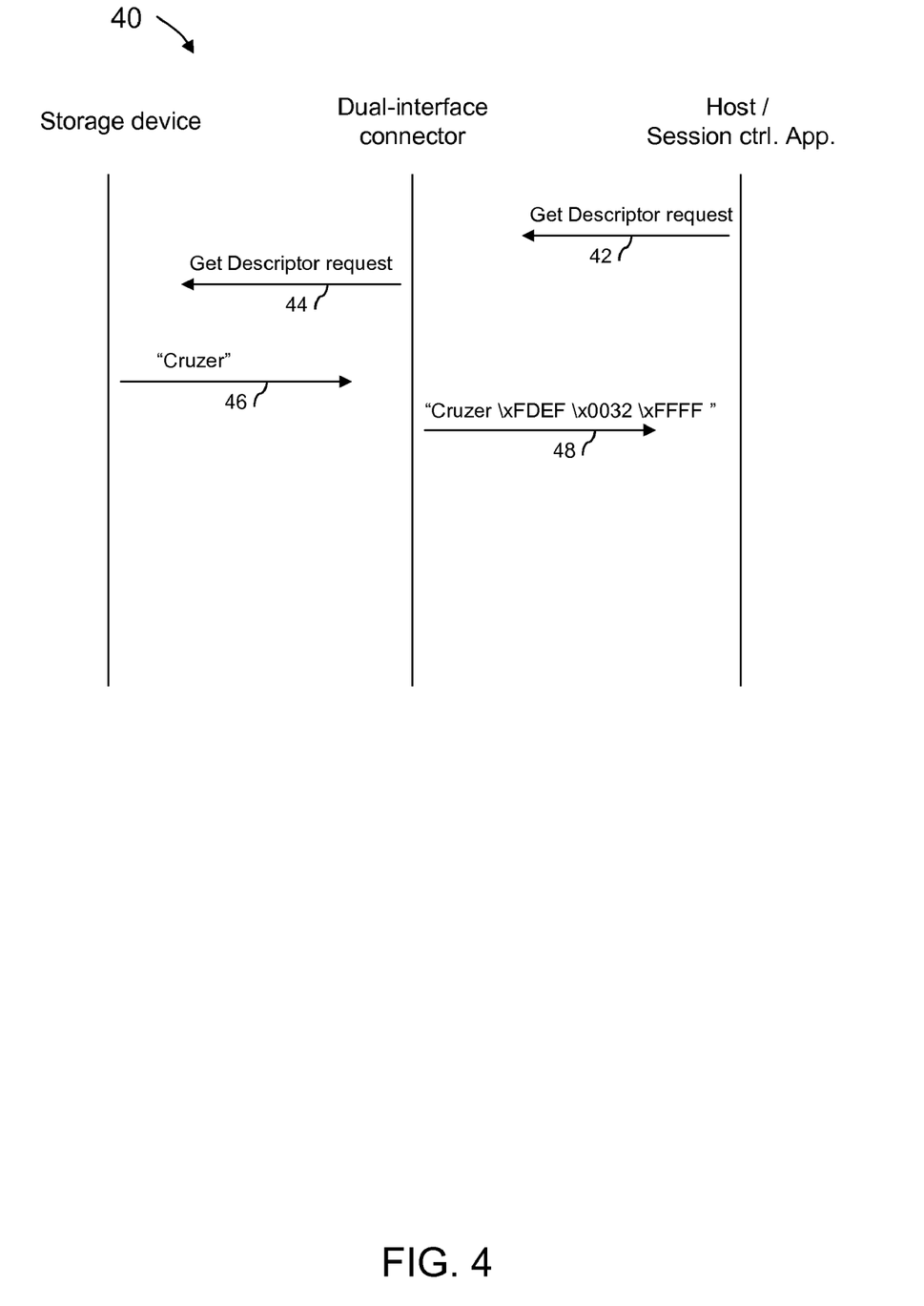
FIG. 4 is a schematic illustration showing signals flowing between the storage device and the host, during the enumeration process, according to one embodiment.

FIG. 4 is a schematic illustration 40 showing signals flowing between the storage device and the host, during the enumeration process, according to one embodiment.

As mentioned above, with storage device 12 being connected to host 14 via dual-interface connector 10, dual-interface connector 10 notifies session control application 22 residing on host 14 of connection of a storage device by modifying signals that are transmitted between storage device 12 and host 14 during the enumeration process using descriptors.

Dual-interface connector 10 receives a Get Descriptor request from host 14 (via control signal 42) and forwards this request to storage device 12 (via control signal 44). Storage device 12 then responds back to dual-interface connector 10 by transmitting a string descriptor, such as a known, predetermined value defining the Product ID of the storage device (via data signal 46). In this example, the product ID of storage device 12 is "Cruzer". A Product ID of a first device refers to a field in one of the descriptors that defines the configuration of a second device (product) which the first device is connected to.

As part of this process, the dual-interface connector 10 modifies the string descriptor it receives from the storage device 12 by adding a predetermined value (e.g., nonprintable characters) at the end of the string descriptor; and returns the modified descriptor to the host (via data signal 48). In this example, the dual-interface connector 10 modifies the string descriptor to be "Cruzer \xFDEF \x0032 \xFFFF". Modifications made to this string descriptor by dual-interface connector 10 (e.g., Unicode character sequences defined by "\xFDEF and \FFFF") are automatically removed by the session control driver, so that user applications on the host do not receive these modifications.

Then as described above, the modified descriptor (that is detected by session control application 22 residing on host 14) indicates to session control application 22 that storage device 12 is now connected to host 14.

FIG. 5 is a schematic illustration 50 showing signals flowing between dual-interface connector 10 and host 14, according to another embodiment.

As mentioned above, dual-interface connector 10 notifies session control application 22 residing on host 14 when storage device 12 is disconnected from it using a specialized sense code, in form of a CHECK CONDITION status signal for example.

Dual-interface connector 10 receives a host request from host 14 (via control signal 52), and responds by transmitting a CHECK CONDITION status (via control signal 54). The CHECK CONDITION status signal indicates to session control application 22 residing on host 14 when storage device 12 is disconnected from dual-interface connector 10.

Then, in response to a RequestSense command from host 14 (transmitted from host 14 via control signal 56), dual-interface connector 10 forwards host 14 a specialized sense code (via control signal 58).

Figure 6A:
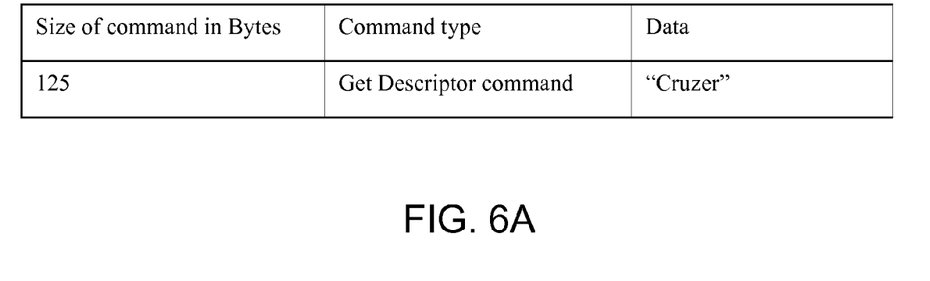
FIG. 6A shows a data structure of a command that is transmitted from the storage device of FIG. 2 in response to a host request.

FIG. 6A shows a data structure 60 of a command (e.g., string descriptor) that is transmitted from storage device 12 of FIG. 2, during enumeration for example, in response to a host request, such as a Get Descriptor request.

The Get Descriptor command is a string descriptor type. String descriptors provide human readable information and are optional. If they are not used, any string index fields of descriptors must be set to zero indicating there is no string descriptor available.

Following the standard flow that leads to the exemplary requested command, data structure 60 is made up of the following exemplary format: The first field specifies the length of the command in bytes; the second field indicates the command type; and the third field indicates the data bits.

With respect to the example provided herein above, the length of the command in bytes (field 1) is set to 125 bytes, for example; the command type (field 2) is a Get Descriptor command; and the data bytes include the string descriptor "Cruzer".

Figure 6B:
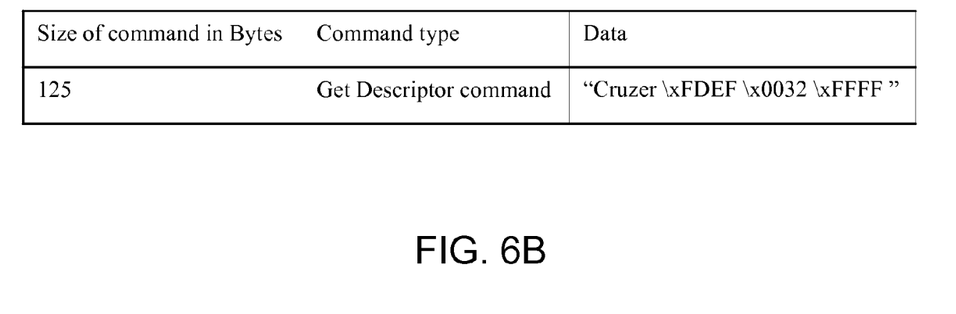
FIG. 6B shows a data structure of a command that is transmitted from the storage device of FIG. 2 and further modified by the dual-interface connector, in response to a host request.

FIG. 6B shows a data structure 62 of a command (e.g., string descriptor) that is transmitted from storage device 12 and modified by dual-interface connector 10, during enumeration for example, in response to a host request, such as a Get Descriptor request.

Again, following the standard flow that leads to the exemplary requested command, the first field specifies the length of the command in bytes as 125 bytes; and the second field indicates the command type as a Get Descriptor command. In this example, the third field indicates the data bits, as the modified string descriptor "Cruzer \xFDEF \x0032 \xFFFF".

Figure 7:
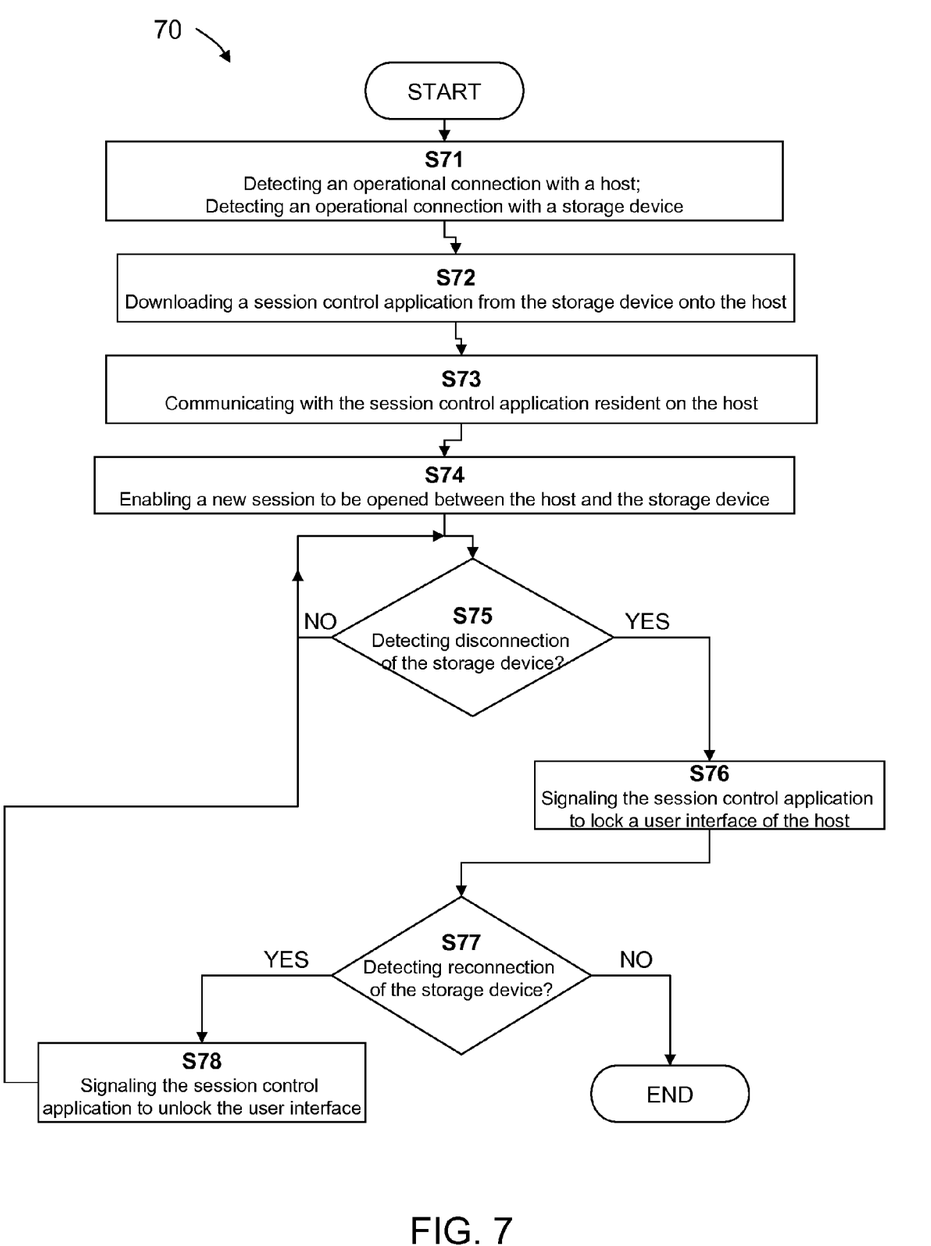
FIG. 7 is a flow chart of a method of connecting the storage device of FIG. 2 with a host, according to one embodiment.

FIG. 7 is a flow chart of a method 70 of connecting a storage device with a host, according to one embodiment. The method depicted herein may be performed by dual-interface connector 10 of the exemplary embodiments functioning as a gateway in traversing signals between a storage device and the host. With dual-interface connector including control circuitry and a controller being part of the control circuitry, the following steps may be performed by the control circuitry.

With dual-interface connector 10 detecting an operational connection with a host (such as host 14) and an operational connection with a storage device (such as storage device 12) (S71), dual-interface connector 10 optionally downloads session control application 22 from storage device 12 onto host 14 (S72). Then at S73, dual-interface connector 10 functions as a gateway in communicating with session control application 22 resident on host 14. As mentioned above, session control application 22 is configured to lock a user interface of host 14 after storage device 12 is disconnected from host 14 and to unlock the user interface after storage device 12 is re-connected to host 14 (with dual-interface connector 10).

In this example, storage device 12 launches session control application 22 onto host 14 upon connection to host 14 and using the resources of dual-interface connector 10. However as also mentioned above, session control application 22 may be optionally preinstalled on host 14 and/or downloaded onto host 14 from any other source that is not dual-interface connector 10.

Next at S74, dual-interface connector 10 operates in a first mode of operation in enabling host 14 to open a new session with storage device 12.

The detection may be prompted by a user connecting his/her USB flash drive to dual-interface connector 10 of the exemplary embodiments and then connecting dual-interface connector 10 (including the USB flash drive) to host 14, or by connecting dual-interface connector 10 to a host and only then connecting dual-interface connector 10 (which is now connected to the host) to his/her USB flash drive. In other words, an operational connection with a host may be detected by dual-interface connector 10 prior to connecting storage device 12 to host 14, subsequent to connecting storage device 12 to host 14, or while connecting storage device 12 to host 14. Note that no powering up of dual-interface connector 10 is required (either prior to connection to host 14 or subsequent to connection to host 14).

Dual-interface connector 10 may detect an operational connection with host 14 and storage device 12 by receiving signals from host 14 and storage device 12, via a host interface and a storage device interface respectively. Such interfaces may be enabled by control circuitries that connect a connectable host and storage device to a controller within dual-interface connector 10. Again, an operational connection may be a physical and operational connection (for example plugging the storage device into the storage device interface) or it may be an operational connection only.

At S75 dual-interface connector 10 determines storage device 12 is disconnected from dual-interface connector 10.

At S76, with the detection of an operational disconnection of storage device 12 from dual-interface connector 10 (for example upon a user disconnecting/unplugging/removing his USB flash drive from the dual-interface connector 10), dual-interface connector 10 signals session control application 22 resident on host 14 to lock a user interface of host 14. At this step (S46), dual-interface connector 10 is operable in a second mode of operation. As mentioned above, the locking operation prevents a user from interacting with host 14.

At S77, dual-interface connector 10 determines storage device 12 is re-connected to it. Step S77 is applied until dual-interface connector 10 detects such reconnection with the storage device or until dual-interface connector 10 is plugged out of host (at which case the session is terminated and the host logs off the user).

In case storage device 12 is indeed reconnected, then dual-interface connector 10 signals session control application 22 to unlock the user interface of host 14 (S78). This unlocking process reverses the locking operation that is performed at step S76, and the user may continue using storage device 12 in connection with host 14.

Figure 8:
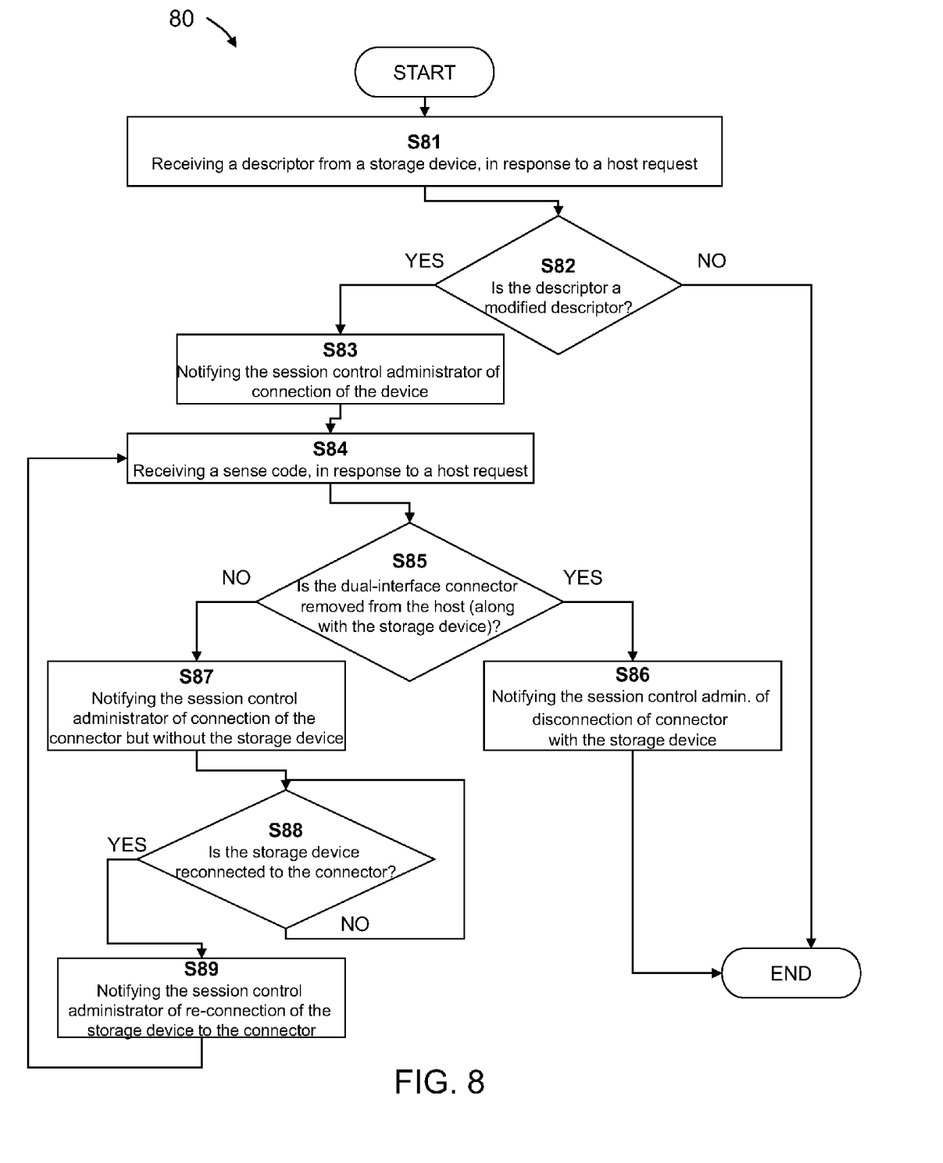
FIG. 8 is a flow chart of a method of using the storage device of FIG. 2 with a session control application resident on the host for controlling access to a session conducted between the storage device and the host, according to one embodiment.

FIG. 8 is a flow chart of a method 80 of using dual-interface connector 10 of the exemplary embodiments with session control application resident 22 on host 14 for controlling access to a session conducted between a storage device (such as storage device 12) and host 14, according to one embodiment. The method depicted herein is performed by session control driver 24 of session control application 22. Again, session control application 22 typically includes session control driver 24 and session control administrator 26 in connection thereof.

At S81, with host 14 establishing communication with storage device 12 (via dual-interface connector 10), session control driver 24 receives a descriptor from storage device 24. The descriptor is transmitted from storage device 12, via controller 20 of dual-interface connector 10, in response to a host request.

At S82, session control driver 24 determines whether storage device 12 is connected to host 14 directly or connected to host 14 via dual-interface connector 10. Session control driver 24 may determine this by checking if the received descriptor is a modified descriptor (i.e., previously modified by dual-interface connector 10 due to the connection of storage device 12), or an un-modified descriptor that is transmitted to host 14 from storage device (through dual-interface connector 10) as is.

If the descriptor has not been modified (i.e., storage device 12 is not connected to dual-interface connector 10), then the method comes to an end. However, if the descriptor is a modified descriptor (i.e., storage device 12 is connected to dual-interface connector 10), then session control driver 24 notifies session control administrator 26 of the connection.

Next at S84, session control driver 24 receives a disconnection signal as an indication of a disconnection of a particular device. In the exemplary embodiment, the disconnection signal is provided by dual-interface connector 10 in the form of a sense code, in response to a host request.

Next at S85, the session control driver 24 determines whether dual-interface connector 10 is now disconnected/removed from host 14 (along with the storage device itself), or whether dual-interface connector 10 is still connected to host 14 but without storage device 12. Session control driver 24 may determine such disconnection based on a bus reset signal that is transmitted to host 14 from dual-interface connector 10 (or from a hub that is operatively connected to dual-interface connector 10).

If an interrupt, indicating a full disconnection state (i.e., dual-interface connector 10 is now disconnected from host 14 along with storage device 12) is received by session control driver 24, then session control driver 24 notifies session control administrator 26 that dual-interface connector 10 and storage device 12 are disconnected from host 14 (S86) and the method comes to an end.

However, if session control driver 24 receives a specialized sense code indicating a partial disconnection state (i.e., dual-interface connector 10 remains connected to host 14 but without storage device 14) in response to a RequestSense command from host 14, then session control driver 24 notifies session control administrator 26 accordingly (S87).

At this phase, session control administrator 26 is operable to lock the user interface of host 14.

Next at S88, session control driver 24 proceeds to monitor sense codes being transmitted to host 14, in response to corresponding host requests, until an indication for reconnection of storage device 12 with dual-interface connector 10 is detected (or until disconnection of dual-interface connector 10 is detected). A reconnection as such may be detected by session control driver 24 with the receipt of a non-specialized sense code (or with the receipt of any other indication for re-connection is received, for example with the receipt of a host request response other than a CHECK CONDITION status).

At this phase, if the received sense code is a specialized sense code (i.e., the storage device is still disconnected from the host), then the method returns to step S88 and continues to monitor sense codes being transmitted to host 14. Again, a specialized sense code is provided by dual-interface connector 10, in response to a host request, to indicate host 14 of the absence of a connectable storage device.

However if at any point in time a particular sense code is not a specialized sense code (i.e., storage device 12 is now re-connected to host 14), then session control driver 24 notifies session control administrator 26 accordingly (S89) and the method returns to step S84. Again, in response to receiving an indication for a reconnection of storage device 12 session control administrator 26 is operable to unlock the user interface of host 14.

As will be appreciated by those familiar in the art, current devices employ a wide variety of different architectures and it is expected that new architectures will continue to be developed. In general, the exemplary embodiments may be employed in conjunction with a wide variety of different types and/or number of memory cards, so long as the card adapter being used has suitable interface connections and suitable processing power.

The embodiments, various examples of which are described herein, may be realized in hardware, software, firmware or any combination thereof. A typical combination of hardware and software could be a general purpose computer system with a computer program that, when being loaded and executed, controls the computer system such that it carries out the methods described herein. The concepts described above can also be embedded in a computer program product, which comprises all the features enabling the implementation of the embodiments described herein, and which, when loaded in a computer system is able to carry out these embodiments. Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

Having described the various embodiments of systems and a method, it is to be understood that the description is not meant as a limitation, since further modifications will now suggest themselves to those skilled in the art, and it is intended to cover such modifications as fall within the scope of the appended claims.

The invention claimed is:

1. A device for providing multiple interfaces for connecting between multiple devices, the device comprising:
 a storage device interface to connect to a storage device;
 a host interface to connect to a host; and
 a controller coupled to the storage device interface and to the host interface,
  wherein in a first mode, the controller is configured to allow the host to establish an open session between the storage device and the host in response to detecting that the storage device is operatively connected to the storage device interface and that the host is operatively connected to the host interface, wherein the open session enables the host to retrieve data from the storage device, to write data to the storage device, and to initiate executing an application on the host;
  wherein while the open session is established between the storage device and the host, in a second mode of operation, the controller is configured to maintain the open session by preventing the application from terminating and by locking a user input interface of the host in response to the storage device being physically disconnected from the storage device interface, to provide an indication to the host that the storage device is not electrically connected to the storage device interface, and in response to the storage device being reconnected to the storage device interface, to automatically unlock the user input interface and to continue the open session between the storage device and the host; and in response to the host interface physically disconnecting from the host and the storage device interface physically disconnecting from the storage device, to end the open session by terminating execution of the application, wherein a user is logged off of the host when the open session is ended.

2. The device of claim 1, wherein the storage device is a Universal Serial Bus (USB) flash drive.

3. The device of claim 2, wherein the USB flash drive includes a wireless interface configured to enable connection of the USB flash drive to the storage device interface.

4. The device of claim 1, wherein the host is configured to:
 lock a user interface of the host and maintain the session between the storage device and the host when the storage device is disconnected from the storage device interface; and
 automatically unlock the user interface and continue the session between the storage device and the host when the storage device is reconnected to the storage device interface.

5. The device of claim 1, wherein the controller is operable to modify a descriptor provided by the storage device to the host and wherein a session control application resides on the host and configures the host to be responsive to the modified descriptor provided by the storage device.

6. The device of claim 5, wherein the session control application is received by the host from the storage device or the controller.

7. The device of claim 1, wherein the indication includes a signal.

8. A host to connect to a device functioning as a dual-interface connector, the host comprising:
 a user interface;
 a device interface that is configured to operatively connect with a storage device and to a device functioning as a dual-interface connector; and
 a session control application that is operative to:
  unlock the user interface in response to detecting that the storage device is connected to the host, via the dual-interface connector, to establish an open session with the storage device, wherein the open session enables the host to retrieve data from and to write data to the storage device, and to initiate executing a user application on the host;
  maintain the open session by locking the user interface and preventing the session control application from terminating in response to determining the storage device is physically disconnected from the dual-interface connector and that the storage device is not electrically connected to the host, via the dual-interface connector;

automatically unlock the user interface and continue the open session between the storage device and the host in response to determining that the storage device is reconnected to the host, via the dual-interface connector; and end the open session in response to determining that the dual-interface connector is physically disconnected from both the host and from the storage device by logging off a host user and terminating the user application.

9. The host of claim 8, wherein in response to determining that the storage device has been disconnected from the dual-interface connector while the dual-interface connector remains connected to the device interface, the user interface of the host is locked.

10. The host of claim 9, wherein in response to determining that the storage device has been reconnected to the dual-interface connector while the dual-interface connector remains connected to the device interface, the user interface of the host is automatically unlocked.

11. The host of claim 8, wherein in response to determining that the dual-interface connector has been disconnected from the device interface, the session between the host and the storage device is terminated and the user interface is unlocked.

12. The host of claim 8, wherein the session control application is further operative to determine when a modified descriptor is received at the device interface, wherein the modified descriptor includes a standard descriptor for the storage device augmented by a predetermined value indicating a presence of the device functioning as the dual-interface connector.

13. The host of claim 12, wherein the session control application is operative to remove the predetermined value from the modified descriptor, wherein the standard descriptor is provided to at least one of:
the user interface; and
other programs executing on the host.

14. The host of claim 8, wherein the session control application is downloaded to the host from the storage device or from the dual-interface connector in response to a first operational connection being established between the storage device and the device and a second operational connection being established between the host and the device.

15. A method, comprising:
in a host, performing:
starting an open session between a data storage device and the host via a device operationally connected between the data storage device and the host, wherein the open session enables the host to retrieve data from the data storage device, to write data to the data storage device, and to initiate executing an application on the host;

receiving an indication via the device after the data storage device has been physically disconnected from the device indicating that the data storage device has been electrically disconnected from the device, and in response to receiving the indication that the data storage device has been electrically disconnected from the device, locking a user interface of the host, preventing the application from terminating, and maintaining the open session between the host and the data storage device;

in response to receiving a second indication indicating that the data storage device has been reconnected to the device, automatically unlocking the user interface and continuing the open session between the host and the data storage device; and in response to determining that the device is physically disconnected from both the host and from the data storage device, ending the open session by logging off a host user and terminating execution of the application.

16. The method of claim 15, wherein the session comprises a single communication channel between the data storage device and the host, and further comprising, in response to detecting that the device has been disconnected from the host, terminating the session between the host and the data storage device.

17. The method of claim 15, wherein the host supports a session control application that is operative to identify when a modified data storage device descriptor is received, wherein the modified data storage device descriptor includes a standard device descriptor for the data storage device connected to the host and a code appended to the standard device descriptor.

18. The method of claim 17, wherein the code includes a hex code, and wherein the session control application is further operative to remove the hex code from the modified data storage device descriptor such that the standard device descriptor for the data storage device is presented to other programs executing on the host.

19. The method of claim 17, wherein the session control application is received by the host from one of the data storage device and a network.

20. The method of claim 15, wherein the data storage device is a universal serial bus (USB) flash drive.

* * * * *